United States Patent
Inoue et al.

(10) Patent No.: US 6,672,981 B2
(45) Date of Patent: Jan. 6, 2004

(54) TRANSMISSION SHIFT CONTROL APPARATUS ARRANGED TO PERFORM COMPULSORY SHIFT-DOWN ACTION OF CONTINUOUSLY VARIABLE TRANSMISSION

(75) Inventors: Daisuke Inoue, Toyota (JP); Masami Sugaya, Susono (JP); Hideki Yasue, Toyota (JP); Kunio Morisawa, Toyota (JP); Katsumi Kono, Toyota (JP); Tadashi Tamura, Nishikamo-gun (JP); Ryoji Habuchi, Okazaki (JP); Hiroji Taniguchi, Okazaki (JP); Kenji Matsuo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 09/988,351

(22) Filed: Nov. 19, 2001

(65) Prior Publication Data
US 2002/0072441 A1 Jun. 13, 2002

(30) Foreign Application Priority Data
Dec. 12, 2000 (JP) ...................................... 2000-377367

(51) Int. Cl.$^7$ .............................................. F16H 63/00
(52) U.S. Cl. .......................................... 474/28; 474/18
(58) Field of Search ............................. 474/18, 28, 70; 477/44, 46

(56) References Cited

U.S. PATENT DOCUMENTS 4,699,604 A * 10/1987 Yokoyama ................... 474/18
5,514,047 A * 5/1996 Tibbles et al. ................. 477/46
6,335,573 B1 * 1/2002 Eguchi et al. ............. 290/40 C
6,371,883 B1 * 4/2002 Eguchi ......................... 477/73
6,379,282 B1 * 4/2002 Aoki ........................... 477/109
6,422,972 B1 * 7/2002 Eguchi ....................... 477/107

FOREIGN PATENT DOCUMENTS

| JP | 3-292452 | | 12/1991 | |
| JP | 05153706 A | * | 6/1993 | ........... B60L/15/20 |

* cited by examiner

Primary Examiner—Thomas R. Hannon
Assistant Examiner—Vicky A. Johnson
(74) Attorney, Agent, or Firm—Oblon, Spivak, McClelland, Maier & Neustadt, P.C.

(57) ABSTRACT

A shift control apparatus for controlling a continuously variable transmission device including a continuously variable transmission mechanism having rotary elements and operable to transmit a rotary motion of a drive power source of an automotive vehicle to a drive wheel of the automotive vehicle, such that a speed ratio of said mechanism is continuously variable, the shift control apparatus includes a power-transmission-state determining device for determining whether the mechanism is placed in a non-power-transmitting state, a speed-ratio determining device for determining whether the mechanism is placed in a lowest-speed position, a rotation-stop detecting device for determining whether the rotary elements are at rest, and a compulsory-speed-ratio-change implementing device for effecting a compulsory shift-down action of the mechanism toward the lowest-speed position when the mechanism is placed in the non-power-transmitting state while the mechanism is not placed in the lowest-speed position and while the rotary elements of the mechanism are at rest.

8 Claims, 11 Drawing Sheets

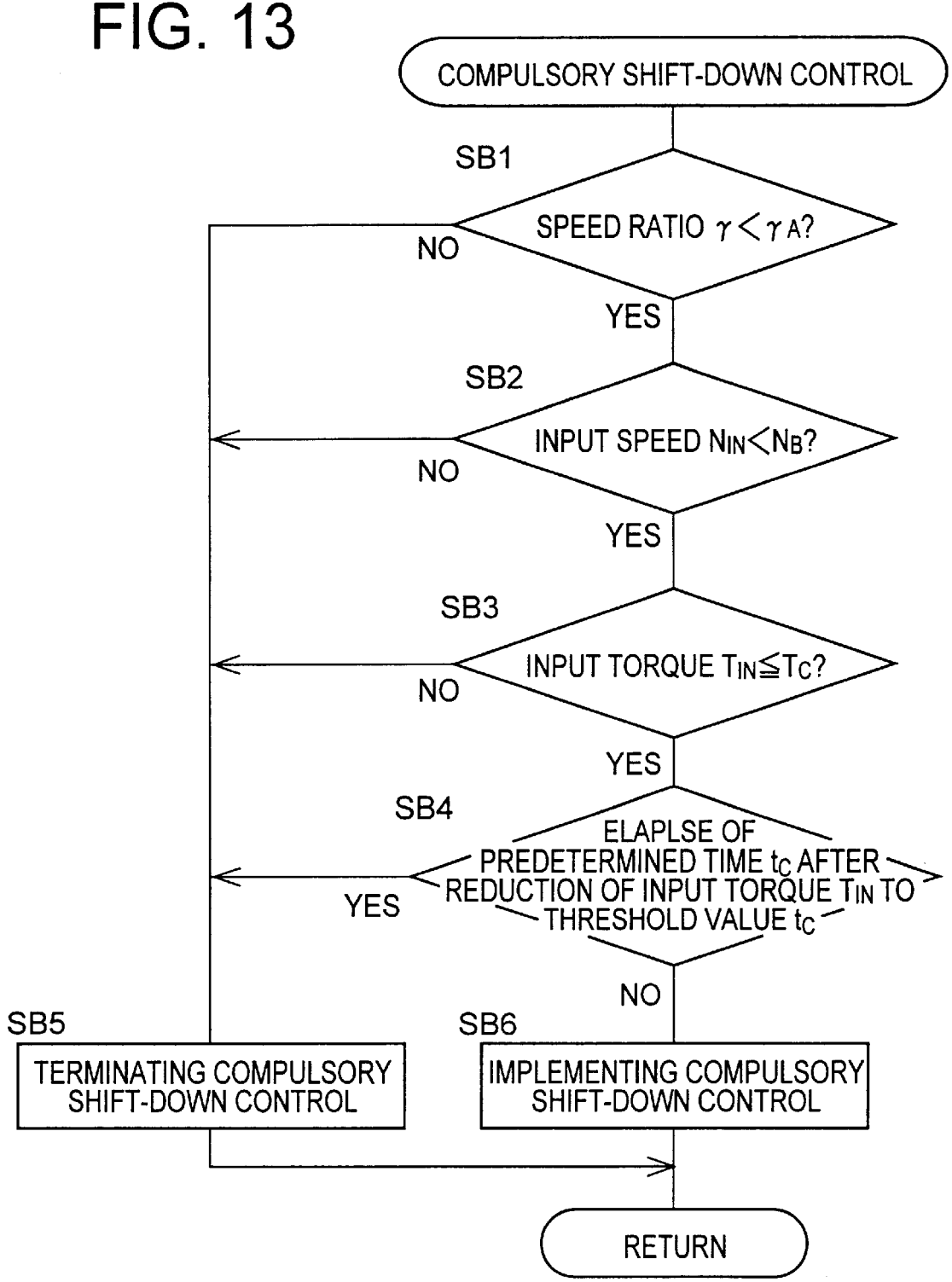

TRANSMISSION SHIFT CONTROL APPARATUS ARRANGED TO PERFORM COMPULSORY SHIFT-DOWN ACTION OF CONTINUOUSLY VARIABLE TRANSMISSION

This application is based on Japanese Patent Application No. 2000-377367 filed on Dec. 12, 2000, the contents of which are incorporated hereinto by reference.

BACKGROUND OF THE INVENTION

1. Field of the Invention

The present invention relates to improvements of a shift control apparatus for controlling a continuously variable transmission device of an automotive vehicle, and more particularly to techniques for assuring a shift-down action of a continuously variable transmission mechanism of the transmission device toward its lowest-speed position having the highest speed reduction ratio, before the vehicle is re-started.

2. Discussion of Related Art

A continuously variable transmission device of an automotive vehicle is generally controlled so as to be shifted down toward its lowest-speed position having the highest speed reduction ratio, when the vehicle is stopped. Where the vehicle is abruptly stopped on an uphill road, for instance, the vehicle may be brought to a stop before completion of the intended shift-down action of a continuously variable transmission mechanism of the transmission device to establish the lowest-speed position. In the continuously variable transmission, it is difficult to change the speed reduction ratio after rotary motions of rotary elements of the continuously variable transmission mechanism have been stopped. If the transmission mechanism has not been placed in the lowest-speed position before re-starting of the vehicle, the vehicle cannot be re-started with a sufficient drive force. Thus, it is difficult to re-start the vehicle when the transmission mechanism is not placed in the lowest-speed position.

In view of the above drawback, there has been proposed a shift control apparatus arranged to effect a compulsory shift-down action of the continuously variable transmission mechanism to increase the speed reduction ratio toward the highest value upon re-starting the vehicle after stopping of the vehicle without the highest speed reduction ratio being established, even before initiation of the rotary motions of the rotary elements of the transmission mechanism, that is, even while the rotary elements of the transmission mechanism are at a standstill or at rest. This arrangement permits the vehicle to be re-started with a sufficient drive force. An example of such a transmission shift control apparatus is disclosed in JP-A-3-292452.

In the known shift control apparatus described above, however, the compulsory shift-down action of the continuously variable transmission toward its lowest-speed position upon re-starting of the vehicle during application of a drive power to the continuously variable transmission mechanism causes slipping on the friction surfaces of the rotary elements in the power transmitting direction, with a result of undesirable friction on the friction surfaces of the rotary elements.

SUMMARY OF THE INVENTION

The present invention was made in view of the background art discussed above. It is therefore an object of the present invention to provide a shift control apparatus for controlling a continuously variable transmission, which permits the transmission to be shifted down toward the lowest-speed position, while preventing or minimizing the friction on the friction surfaces of the rotary elements of the transmission.

The above object may be achieved according to the principle of this invention, which provides a shift control apparatus for controlling a continuously variable transmission device including a continuously variable transmission mechanism having rotary elements and operable to transmit a rotary motion of a drive power source of an automotive vehicle to a drive wheel of the automotive vehicle, such that a speed ratio of the mechanism is continuously variable, the mechanism including rotary elements, comprising: (a) power-transmission-state determining means for determining whether the continuously variable transmission mechanism is placed in a non-power-transmitting state in which the mechanism is not transmitting a drive force; (b) speed-ratio determining means for determining whether the continuously variable transmission mechanism is placed in a lowest-speed position; (c) rotation-stop detecting means for determining whether the rotary elements are at rest; and (d) compulsory-speed-ratio-change implementing means for effecting a compulsory shift-down action of the continuously variable transmission mechanism toward the lowest-speed position when the mechanism is placed in the non-power-transmitting state while the continuously variable transmission mechanism is not placed in the lowest-speed position and while the rotary elements of the mechanism are at rest.

In the shift-control apparatus of the present invention constructed as described above, the compulsory-speed-ratio-change implementing means is operated to effect the compulsory shift-down action of the continuously variable transmission mechanism, when the power-transmission-state determining means determines that the transmission mechanism is placed in the non-power-transmitting state while the speed-ratio determining means determines that the transmission mechanism is not placed in its lowest-speed position and while the rotation-stop detecting means determines that the variable-diameter pulleys are at a standstill or at rest. The compulsory shift-down action of the transmission mechanism is effected by the compulsory-speed-ratio-change implementing means, to establish the lowest-speed position prior to re-starting the vehicle. Further, the compulsory shift-down action of the transmission mechanism by the compulsory-speed-ratio-change implementing means to change the speed ratio toward the value of the lowest-speed position does not cause frictional sliding actions of a power transmitting member on the friction surfaces of the rotary elements in the power transmitting circumferential direction, since the compulsory shift-down action is effected while the transmission mechanism is placed in the non-power-transmitting state in which the transmission mechanism does not transmitting a drive force. In other words, the compulsory shift-down action causes only sliding actions of the power transmitting member in the radial direction, and the speed of these radial sliding actions is considerably low than that of the circumferential sliding actions, so that the amount of wear of the friction surfaces of the rotary elements is significantly reduced. The speed ratio may be defined as a speed reduction ratio, which is a ratio of an input speed of the transmission mechanism to an output speed of the transmission mechanism. In this case, the transmission mechanism has the highest speed reduction ration when it is placed in the lowest-speed position, and the compulsory shift-down action cause the speed reduction ratio to be increased to the highest value.

A first preferred form of the shift control apparatus of the invention is applicable to an automotive vehicle includes a manually operable member which is operable to select one of a plurality of operating states of the continuously variable transmission device and which has a drive position for selecting a power-transmitting state of the transmission device, and a non-drive position for selecting the non-power-transmitting state. In this form of the shift control apparatus, the power-transmission-state determining means is operable to determine that the continuously variable transmission mechanism the is placed in the non-power-transmitting state when a predetermined time has elapsed after the manually operable member has been operated from the drive position to the non-drive position. Since the power transmitting path of the continuously variable transmission device is disconnected the predetermined time after the manually operable member is operated to the non-drive position, the non-power-transmitting state of the transmission mechanism can be highly reliably detected by the power-transmission-state determining means.

According to a second preferred form of the shift control apparatus of this invention, the power-transmission-state determining means is operable to determine that the continuously variable transmission mechanism is placed in the non-power-transmitting state when an input torque of the transmission mechanism has been substantially zeroed. This arrangement permits accurate detection of the non-power-transmitting state of the transmission mechanism, even when substantially the entire output torque of the drive power source (e.g., internal combustion engine) is consumed by an optional device such as an electric generator (for charging a battery) or an air conditioner. The present arrangement permits the compulsory shift-down action of the transmission mechanism even when the drive power source is operated to operate such an optional device.

A third preferred form of the shift control apparatus further comprises time-elapse detecting means for determining whether a predetermined time duration has elapsed after a moment of initiation of the compulsory shift-down action of the continuously variable transmission mechanism by the compulsory-speed-ratio-change implementing means, and the compulsory-speed-ratio-change implementing means is arranged to terminate the compulsory shift-down action when the predetermined time duration has passed after the moment of initiation of the compulsory shift-down action. This arrangement is effective to prevent continuation of the compulsory shift-down action for an unnecessarily long time duration.

In one advantageous arrangement of the above-described third preferred form of the shift control apparatus, the predetermined time duration for which the compulsory shift-down action is effected is determined on the basis of a detected temperature of a working fluid of the continuously variable transmission device, and according to a predetermined relationship between the time duration and the temperature of the working fluid. This arrangement permits the shift-down action of the transmission mechanism for the required minimum time, irrespective of a variation in the viscosity of the working fluid with a change in the fluid temperature.

In another advantageous arrangement of the shift control apparatus, the predetermined time duration is determined on the basis of the speed ratio of the continuously variable transmission mechanism upon initiation of the compulsory shift-down action, and according to a predetermined relationship between the time duration and the speed ratio. This arrangement permits the shift-down action of the transmission mechanism for the required minimum time, which varies with the speed ratio upon initiation of the shift-down action of the transmission mechanism.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 13 is a flow chart illustrating a control operation of an electronic control device according to a second embodiment of this invention.

DETAILED DESCRIPTION OF THE PREFERRED EMBODIMENTS

Figure 1:
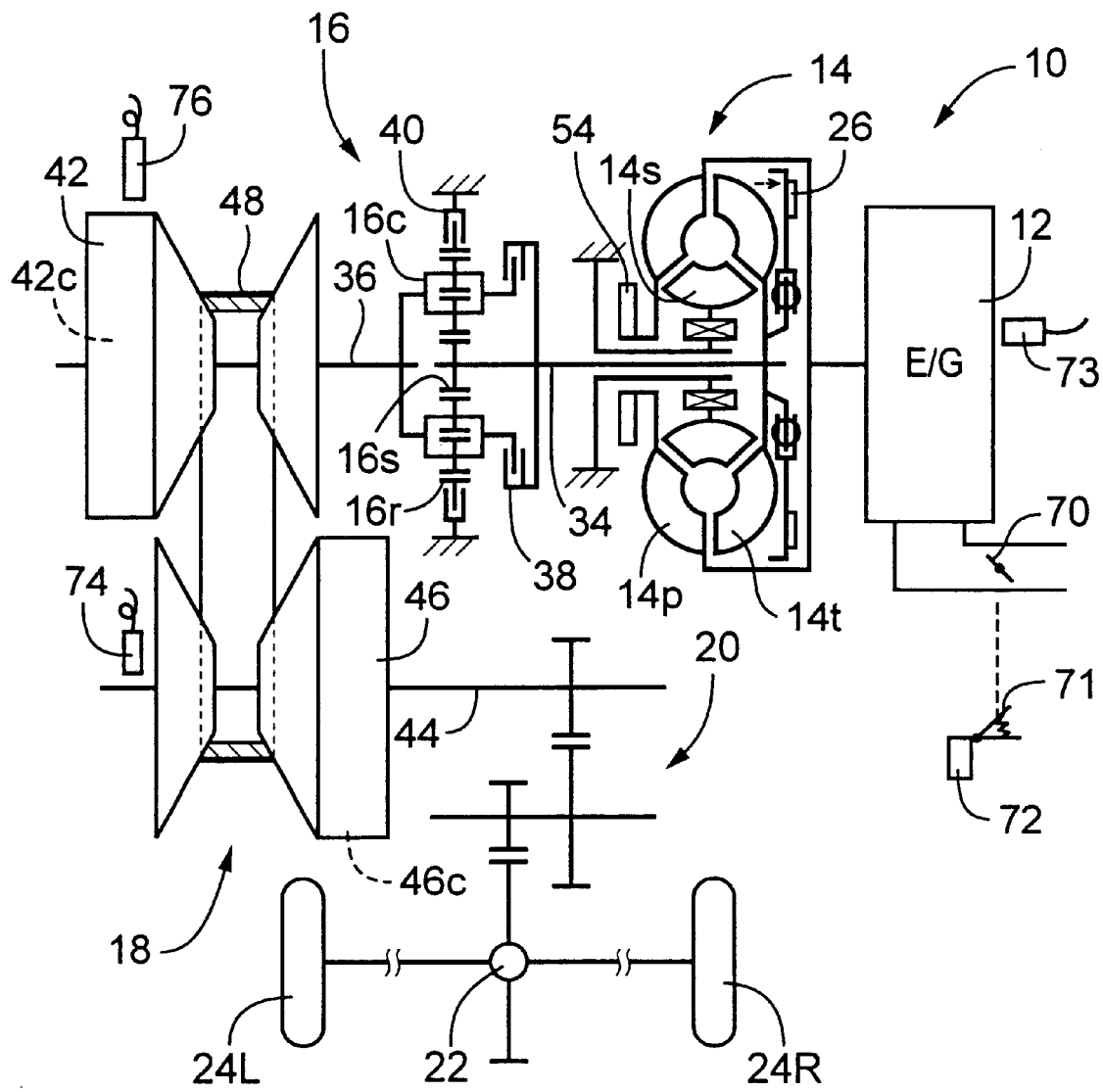
FIG. 1 is a schematic view of a power transmitting system of an automotive vehicle, to which a control apparatus according to one embodiment of this invention is applied.

Referring first to the schematic view of FIG. 1, there is shown a power transmitting system 10 of an automotive vehicle, which includes a belt-and-pulley type continuously variable transmission 18 to which a shift-control apparatus according to a first embodiment of this invention is applied. For instance, the automotive vehicle equipped with the power transmitting system 10 is preferably a transverse FF (front-engine front-drive) vehicle. The power transmitting system 10 includes a drive power source in the form of an internal combustion engine 12 an output of which is transmitted to a differential gear device 22 through a torque converter 14, a forward-reverse switching device 16, a belt-and-pulley type continuously variable transmission (CVT) 18 and a speed reducing gear device 20. The output of the engine 12 is distributed by the differential gear device 22 to left and right drive wheels 24L, 24R. The belt-and-pulley type continuously variable transmission 18 is provided in a power transmission path between the engine 12 and the left and right drive wheels 24L, 24R (e.g., front drive wheels).

The torque converter 14 includes a pump impeller 14p connected to a crankshaft of the engine 12, a turbine impeller 14t connected to the forward-reverse switching device 16 through a turbine shaft 34, and a stationary impeller 14s connected through a one-way clutch to a stationary member. A drive force is transmitted between the pump and turbine impellers 14p, 14t through a working fluid. Between these pump and turbine impellers 14p, 14t, there is disposed a lock-up clutch (direct coupling clutch) 26 arranged to connect the pump and turbine impellers 14p, 14t so that these impellers are rotated as a unit.

The forward-reverse switching device 16 is a planetary gear device of double-pinion type, which includes a sun gear 16s connected to the turbine shaft 34 of the torque converter 14, and a carrier 16c connected to an input shaft 36 of the continuously variable transmission 18. When a forward-drive clutch 38 disposed between the carrier 16c and the sun gear 16s is placed in its engaged state, the forward-reverse switching device 16 is rotated as a unit, to directly connect the turbine shaft 34 to the input shaft 36, so that a forward drive force is transmitted to the drive wheels 24L, 24R. When a reverse-drive brake 40 disposed between a ring gear 16r and a housing of the forward-rear switching device 16 is placed in its engaged state while the forward-drive clutch 38 is placed in its released state, the input shaft 36 is rotated in a direction opposite to the direction of rotation of the turbine shaft 34, so that a reverse drive force is transmitted to the drive wheels 24L, 24R.

The belt-and-pulley type continuously variable transmission 18 includes: an input-side variable-diameter pulley 42 which is mounted on the input shaft 36 and whose effective diameter is variable; an output-side variable-diameter pulley 46 which is mounted on an output shaft 44 and whose effective diameter is variable; and a transmission belt 48 which engages V-grooves defined in the respective variable-diameter pulleys 42, 46. The drive force is transmitted between the two variable-diameter pulleys 42, 46 through a frictional contact of the transmission belt 48 serving as a power transmitting member with the surfaces of the V-grooves of the pulleys 42, 46. The variable-diameter pulleys 42, 46 have respective input-side and output-side hydraulic cylinders (actuators) 42c, 46c operable to change effective widths of the V-grooves of the respective pulleys 42, 46, that is, the effective diameters of the pulleys 42, 46 with which the transmission belt 48 engages. The effective widths of the V-grooves are changed to change the effective diameters of the pulleys 42, 46 by controlling a flow of the fluid into or from the hydraulic cylinder 42c of the input-side pulley 42. This fluid flow control is effected by a shift control valve device 50 provided in a hydraulic control circuit 52 shown in FIG. 4. With the effective diameters of the variable-diameter pulleys 42, 46 being changed under the control of the shift control valve device 50, a speed reduction ratio γ of the continuously variable transmission 18 can be continuously varied. The speed reduction ratio is a ratio γ of an input speed $N_{IN}$ of the transmission 18 to an output shaft $N_{OUT}$ of the transmission 18. It will be understood that the two variable-diameter pulleys 42, 46 and the transmission belt 48 connecting these pulleys 42, 48 constitute a continuously variable transmission mechanism, and that the variable-diameter pulleys 42, 46 serve as rotary elements of the continuously variable transmission mechanism, while the transmission belt 48 serves as the power transmitting member which frictionally contacts the rotary elements to transmit the drive force between the rotary elements.

A hydraulic pressure $P_B$ within the hydraulic cylinder 46c of the output-side variable-diameter pulley 46 corresponds to a squeezing force which is applied from the variable-diameter pulley 46 to the transmission belt 48, and also corresponds to a tension of the transmission belt 48. Accordingly, the hydraulic pressure $P_B$ may be referred to as "belt tension control pressure" determining the tension of the transmission belt 48, "squeezing-force control pressure" determining the squeezing force which is applied from the pulleys 42, 46 to the transmission belt 48, or "pressing-force control pressure" determining a pressing force by which the transmission belt 48 is pressed against the V-groove surfaces of the pulleys 42, 46. The hydraulic pressure $P_B$ is regulated by a squeezing-force control valve 60 provided in the hydraulic control circuit 52, so as to prevent slipping of the transmission belt 48 on the V-groove surfaces of the pulleys 42, 46.

Figure 2:
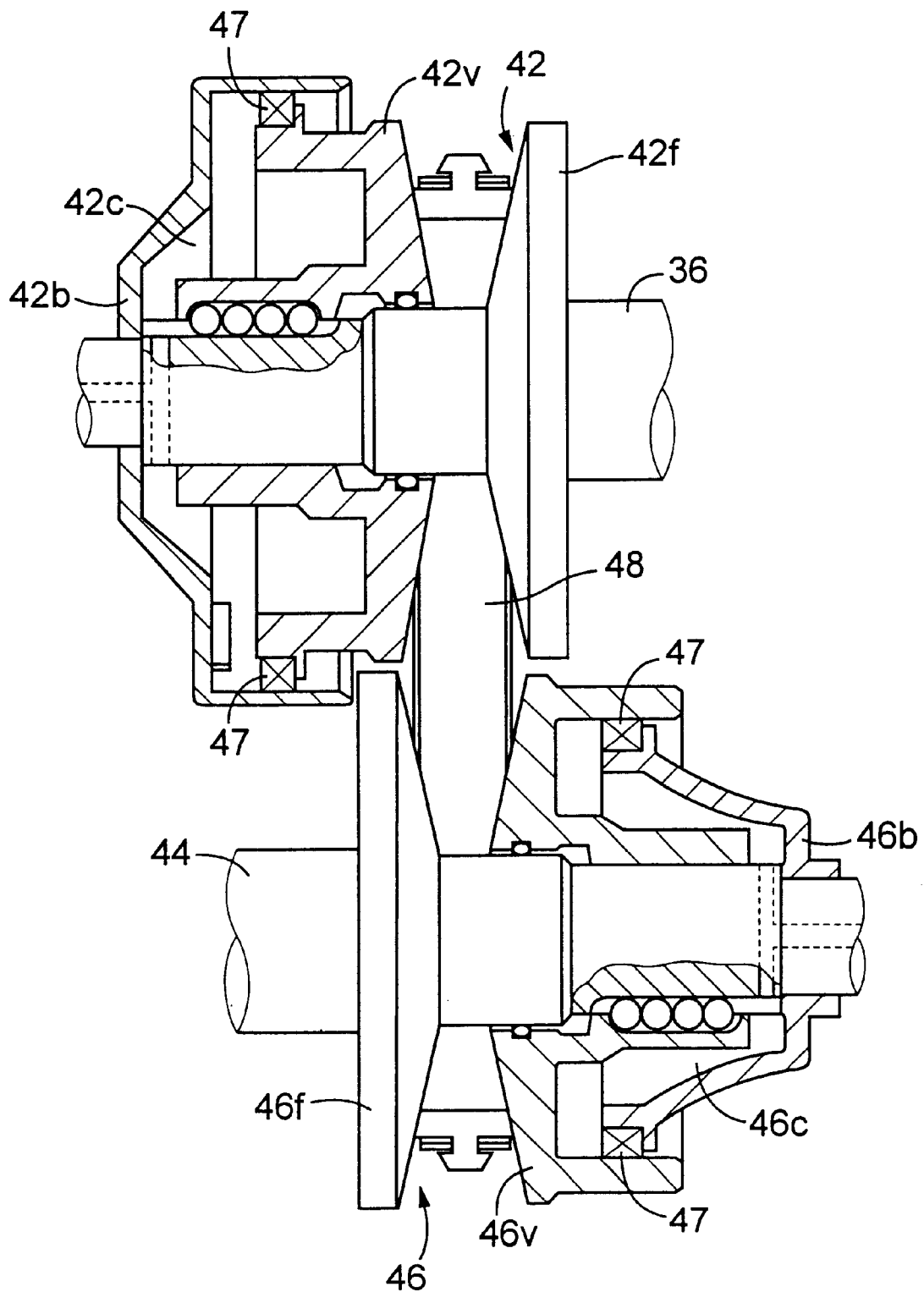
FIG. 2 is a partly cut-away elevational view showing in detail the construction of a belt-and-pulley type continuously variable transmission incorporated in the power transmitting system of FIG. 1.

Referring next to the partly cut-away elevational view of FIG. 2 showing the construction of the belt-and-pulley type continuously variable transmission 18, the input-side variable-diameter pulley 42 includes: a stationary rotor 42f fixed to the input shaft 36; a movable rotor 42v which is axially movably mounted on the input shaft 36 such that the movable rotor 42v cooperates with the stationary rotor 42f to define the V-groove and such that the movable rotor 42v is rotated with the input shaft 36; and a cylinder body 42b which is fixed to the input shaft 36 so as to slidably engage the movable rotor 42v. The movable rotor 42v serving as a piston cooperates with the cylinder body 42b to constitute the hydraulic cylinder 42c described above. The output-side variable-diameter pulley 46 includes: a stationary rotor 46f fixed to the output shaft 44; a movable rotor 46v which is axially movably mounted on the output shaft 44 such that the movable rotor 46v cooperates with the stationary rotor 46f to define the V-groove and such that the movable rotor 46v is rotated with the output shaft 44; and a cylinder body 46b which is fixed to the output shaft 44 so as to slidably engage the movable rotor 46v. The movable rotor 46v serving as a piston cooperates with the cylinder body 46b to constitute the hydraulic cylinder 46c described above. These hydraulic cylinders 42c, 46c are provided with sealing members 47 for substantial fluid tightness between the movable rotors 42v, 46v and the cylinder bodies 42b, 46b. Even in the presence of these sealing members 47, the hydraulic cylinders 42c, 46c may more or less suffer from fluid leakage.

Figure 3:
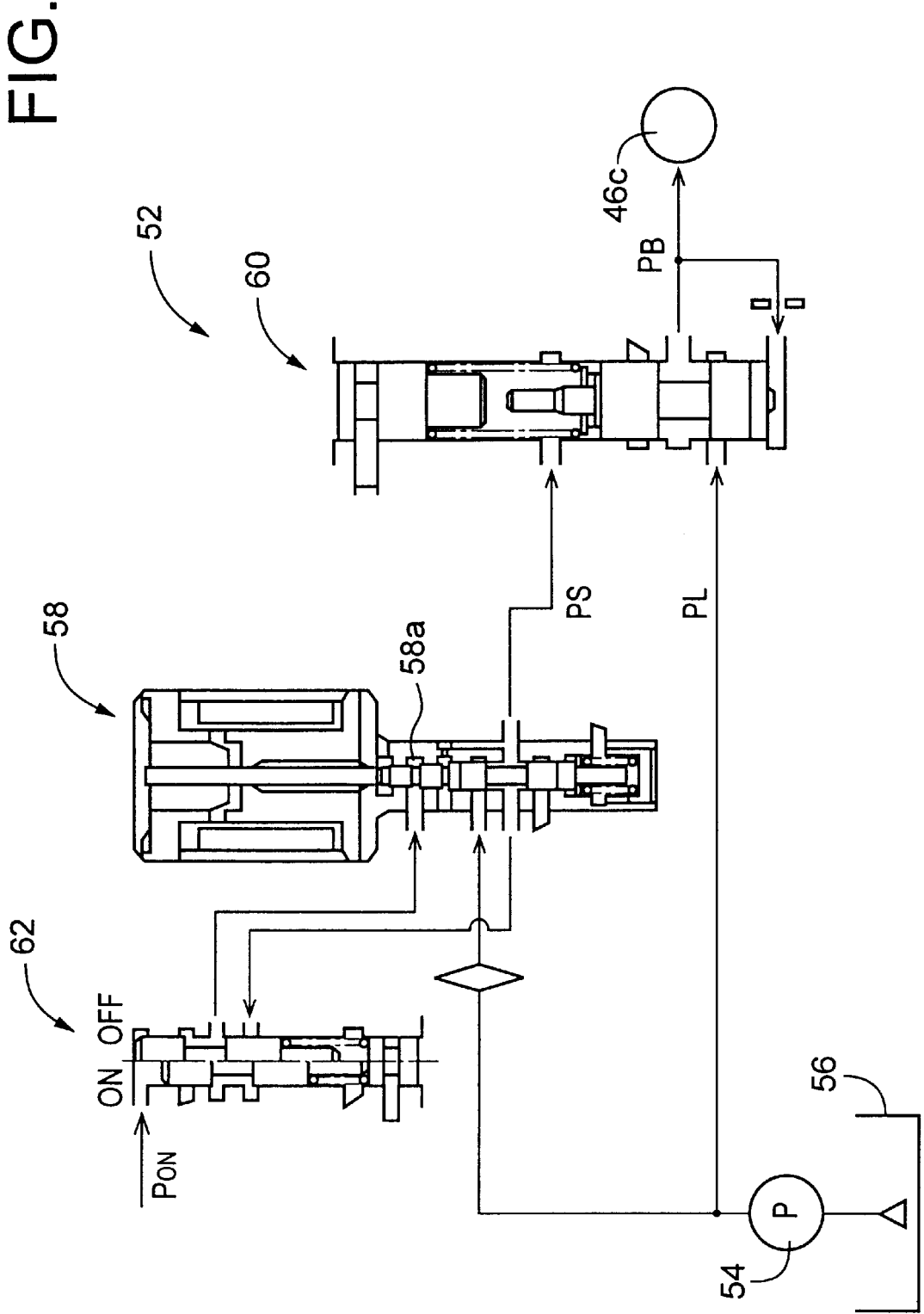
FIG. 3 is a view showing a portion of a hydraulic control circuit for controlling the belt-and-pulley type continuously variable transmission, which portion relates to a belt tension control for controlling the tension of a belt of the transmission.
Figure 4:
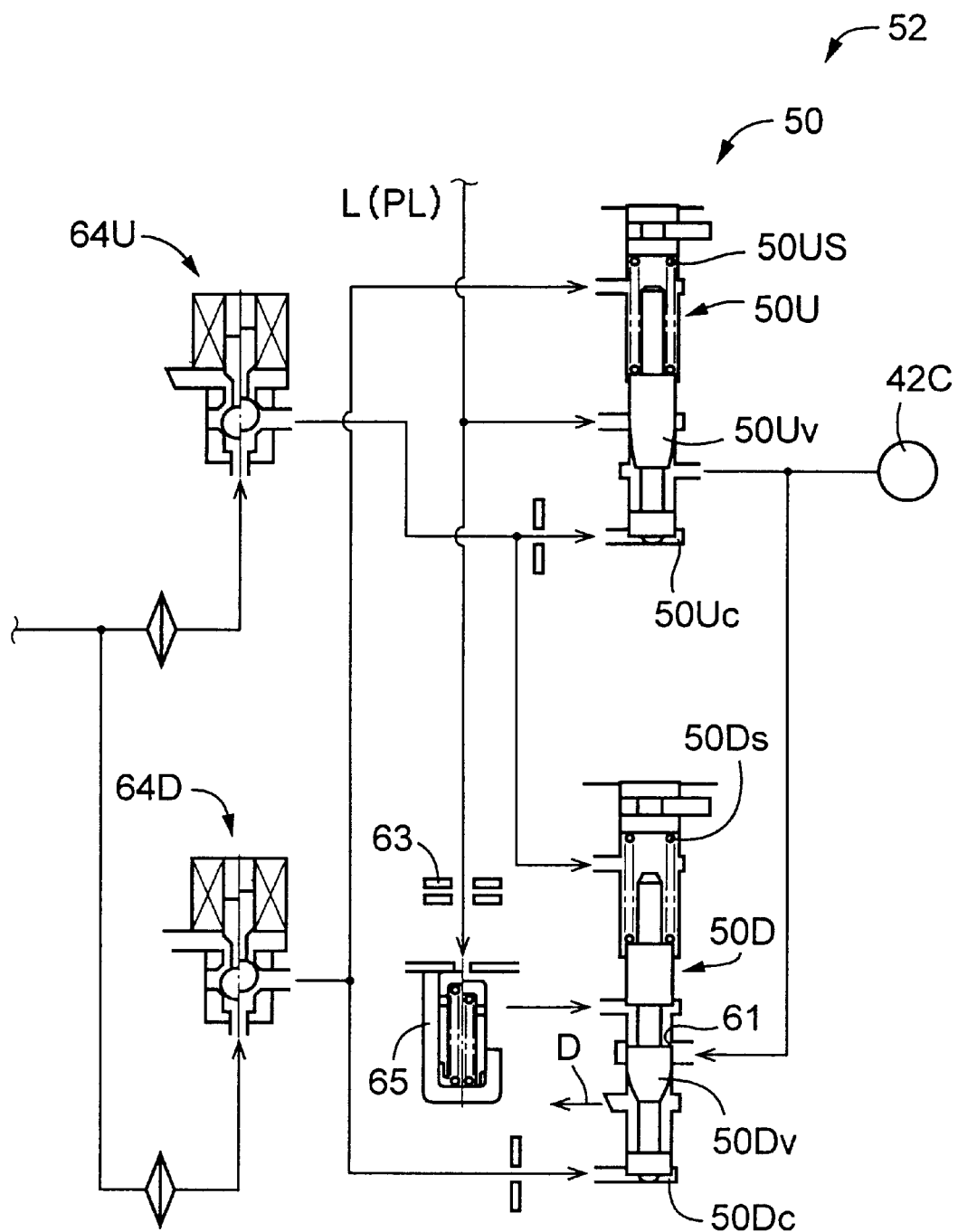
FIG. 4 is a view showing a portion of the hydraulic control circuit for the continuously variable transmission of FIG. 2, which portion relates to a shift control for controlling the speed reduction ratio of the continuously variable transmission.

FIGS. 3 and 4 show an example of the hydraulic control circuit 52 indicated above. Described more specifically, FIG. 3 shows a portion of the hydraulic control circuit 52, which relates to an operation to regulate the belt tension control pressure, while FIG. 4 shows a portion of the hydraulic control circuit 52, which relates to an operation to control the speed reduction ratio γ of the transmission 18. Referring to FIG. 3, the hydraulic control circuit 52 includes an oil reservoir 56 for storing the working fluid, and a hydraulic pump 54 which is driven by the engine 12 to pressurize the fluid received from the oil reservoir 56. The pressure of the pressurized fluid delivered from the hydraulic pump 54 is regulated to a predetermined line pressure $P_L$ by a pressure regulating valve (not shown), and the pressurized fluid having the line pressure $P_L$ is delivered to a linear solenoid valve 58 and the above-indicated squeezing-force control valve 60. The linear solenoid valve 58 is energized with an electric current continuously controlled by an electronic control device 66 (FIG. 5), to control the pressure of the pressurized fluid delivered from the hydraulic pump 54, into a controlled pressure $P_S$ corresponding to the amount of electric current applied to the linear solenoid valve 58. The controlled pressure $P_S$ is applied to the squeezing-force control valve 60, which controls the pressure $P_B$ within the output-side hydraulic cylinder 46c, such that the pressure $P_B$ increases with an increase in the controlled pressure $P_S$. The electronic control device 66 controls the linear solenoid valve 58 to control the hydraulic pressure $P_B$ so that the squeezing force or tension of the transmission belt 48 is minimized while preventing the slipping of the transmission belt 48. The tension of the transmission belt 48, that is, the force of friction between the variable-diameter pulleys 42, 46 and the transmission belt 48 is increased as the hydraulic pressure $P_B$ within the output-side hydraulic cylinder 46c is raised.

The linear solenoid valve 58 has an oil chamber 58a which receives a controlled pressure from a cut-back valve 62 placed when the cut-back valve 62 is placed in its ON state. When the cut-back valve 62 is placed in its OFF state, the cut-back valve 62 is disconnected from the oil chamber 58a, so that the oil chamber 58a is communicated with the atmosphere. Thus, the controlled pressure $P_S$ produced from the oil chamber 58a is made lower when the cut-back valve 62 is placed in the OFF state than in the ON state. When the lock-up clutch 26 of the torque converter 14 is placed in its engaged state, a pilot pressure $P_{ON}$ is applied from a solenoid-operated valve (not shown) to the cut-back valve 62, so that the cut-back valve 62 is brought to its ON state when the lock-up clutch 26 is engaged.

Referring next to FIG. 4, the shift-control valve device 50 includes a shift-up control valve $50_U$ for controlling the speed at which the transmission 18 is shifted up, and a shift-down control valve $50_D$ for controlling the speed at which the transmission 18 is shifted down. The shift-up control valve 50u is arranged to control the rate of supply flow of the pressurized fluid having the line pressure $P_L$ into the hydraulic cylinder 42c of the input-side variable-diameter pulley 42, for thereby controlling the speed of the shift-up action of the transmission 18. The shift-down control valve 50d is arranged to control the rate of discharge flow of the pressurized fluid from the hydraulic cylinder 42c, for thereby controlling the speed of the shift-down action of the transmission 18. The shift-up control valve $50_U$ is connected to a line-pressure passage L for introducing the line pressure $P_L$. The shift-up control valve $50_U$ includes a valve spool $50_{UV}$ for connecting or disconnecting the line-pressure passage L to or from the input-side hydraulic cylinder 42c, and a spring $50_{US}$ for biasing the valve spool $50_{UV}$ toward its closed position, and has an oil chamber $50_{UC}$ for receiving a controlled pressure from a shift-up solenoid-operated valve $64_U$. The shift-down control valve $50_D$ is connected to a drain passage D, and includes a valve spool $50_{DV}$ for connecting the connecting or disconnecting the drain passage D to or from the input-side hydraulic cylinder 42c, and a spring $50_{DS}$ for biasing the valve spool $50_{DV}$ toward the closed position, and has an oil chamber $50_{DC}$ for receiving a control pressure from a shift-down solenoid-operated valve $64_D$. The duty ratios of the shift-up and shift-down solenoid-operated valves $60_U$, $60_D$ are controlled by the electronic control device 66 to apply continuously variable control pressures to the respective oil chambers $50_{UC}$, $50_{DC}$, so that the speed reduction ratio γ of the belt-and-pulley type continuously variable transmission 18 can be continuously changed in the shift-up or shift-down direction, that is, can be continuously reduced to the lowest value or increased to the highest value. When the spool $50_{DV}$ of the shift-down control valve $50_D$ is placed in its closed position, there is formed a fluid passage 61 which permits fluid flows at a relatively low rate between the line-pressure passage L and the input-side hydraulic cylinder 42c. When the spools $50_U$, $50_D$ of the shift-up and shift-down control valves $50_U$, $50_D$ are both placed in their closed positions, the pressurized fluid having the line pressure $P_L$ is supplied to the input-side hydraulic cylinder 42c through the line-pressure passage L, a flow restrictor 63, a one-way valve 65 and the above-indicated fluid passage 62, in order to prevent a change of the speed reduction ratio γ of the transmission 18, which would other take place due to a relatively low rate of leakage flows of the fluid from the input-side and output-side cylinders 42c, 46c even though these cylinders are provided with the sealing members 47. Namely, the fluid may leak from the cylinders 42c, 46c when a load acts on the input or output shaft 36, 44 so as to incline the shaft with respect to the nominal axis of rotation.

Figure 5:
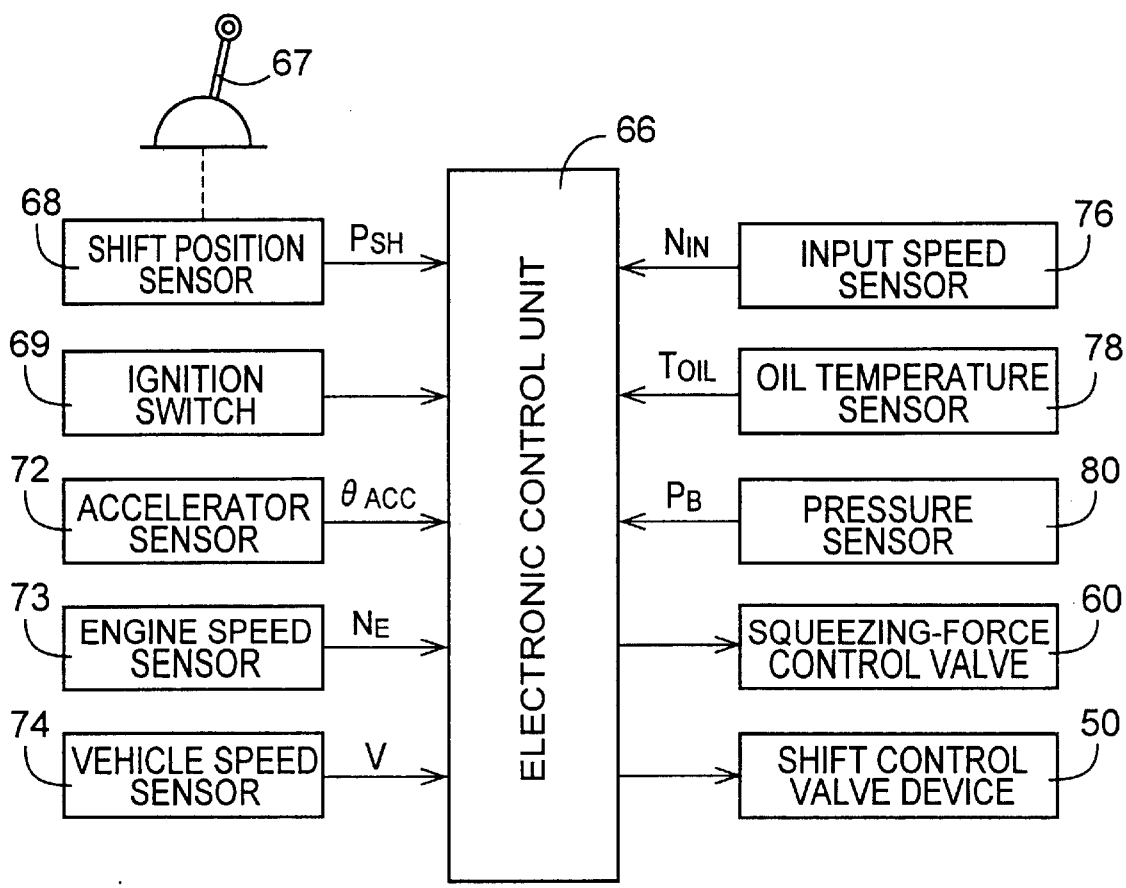
FIG. 5 is a block diagram schematically illustrating the arrangement of the control apparatus according to the first embodiment.

As shown in the block diagram of FIG. 5, the electronic control device 66 is arranged to receive: an output signal of a shift position sensor 68, which represents a presently selected operating position $P_{SH}$ of a manually operated member in the form of a shift lever 67; an output signal of an ignition switch 69 operated by an ignition key, which represents an operation of the ignition key; an output signal of an accelerator sensor 72, which represents an operating amount $θ_{ACC}$ of an accelerator pedal 71 operated to change an angle of opening of a throttle valve 70 of the engine 12; an output signal of an engine speed sensor 73, which represents an operating speed $N_E$ of the engine 12; an output signal of a vehicle speed sensor (an output speed sensor) 74, which represents a vehicle running speed V (as calculated on the basis of a rotating speed $N_{OUT}$ of the transmission 18); an output signal of an input speed sensor 76, which represents a rotating speed $N_{IN}$ of the input shaft 36 of the transmission 18; an output signal of an oil temperature sensor 78, which represents a temperature $T_{OIL}$ of the working fluid within the power transmitting system 10 (within the transmission 18); and an output signal of a pressure sensor 80, which represents the hydraulic pressure $P_B$ within the hydraulic cylinder 46c of the output-side variable-diameter pulley 46, that is, the squeezing-force control pressure $P_B$.

Figure 6:
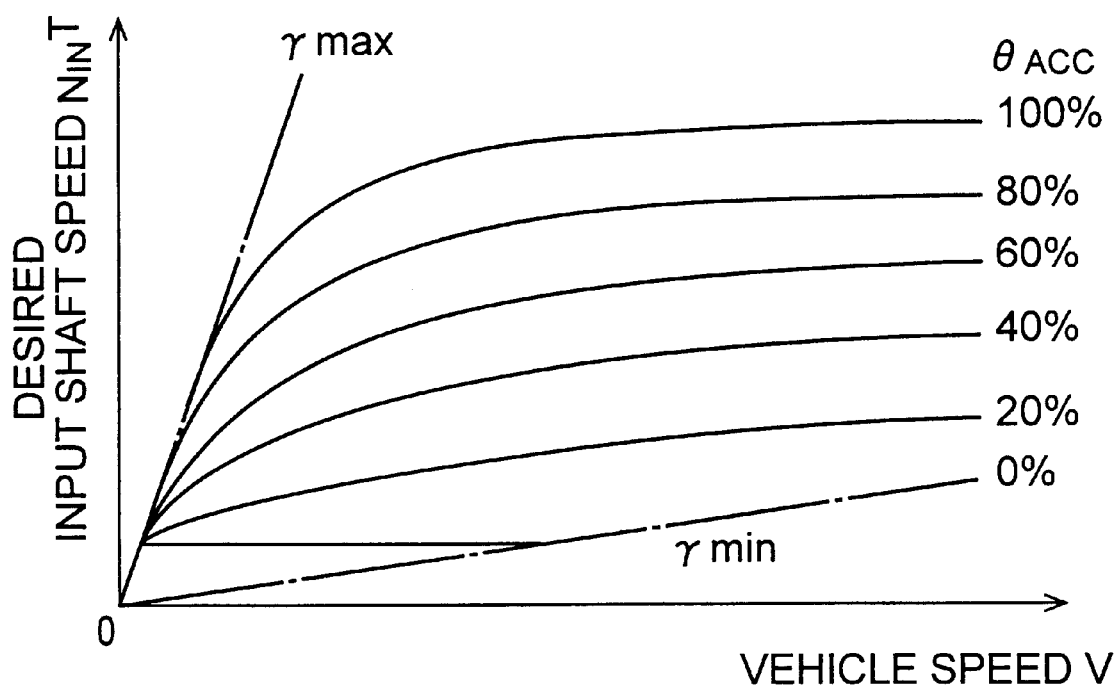
FIG. 6 is a graph indicating stored predetermined relationships used to determine a desired input speed of the transmission used in a speed-ratio control executed by the control device of FIG. 5.

The electronic control device 66 described above functions as the shift control apparatus for controlling a shifting action of the continuously variable transmission 18 of belt-and-pulley type. The electronic control device 66 includes a microcomputer which incorporates a central processing unit (CPU), a read-only memory (ROM), a random-access memory (RAM) and an input-output interface. The CPU operates according to control programs stored in the ROM, while utilizing a temporary data storage function of the RAM, to perform a shift control operation and a belt-force control operation of the transmission 18. To perform the shift control operation, the electronic control device 66 first calculates a desired value $N_{IN}T$ of the input shaft speed $N_{IN}$ of the transmission 18 on the basis of the detected operating amount $\theta_{ACC}$ (%) of the accelerator pedal 71 (indicative of the output value of the engine 12 as desired by the vehicle operator) and the detected vehicle speed V (as calculated from the detected output shaft speed $N_{OUT}$), and according to predetermined relationships between those parameters $\theta_{ACC}$ and V and the desired value $N_{IN}T$. An example of the predetermined relationships is shown in the graph of FIG. 6. These relationships are represented by a data map stored in the ROM of the control device 66. The control device 66 then controls the shift control valve device 50 to control the rate of the fluid flow into or from the hydraulic cylinder 42c of the input-side variable-diameter pulley 42 so that the actual input shaft speed $N_{IN}$ of the transmission 18 coincides with the calculated value $N_{IN}T$. The predetermined relationship of FIG. 6 are formulated to obtain the desired input shaft speed $N_{IN}T$ suitable for operating the engine 12 so as to follow optimum operating characteristic curves at which the engine output is provided at a maximum fuel economy. In FIG. 6, "$\gamma_{max}$" indicates the highest speed reduction ratio of the transmission 18, while "$\gamma_{min}$" indicates the lowest speed reduction ratio. According to the shift control operation performed by the electronic control device 66 according to the data map of FIG. 6, the speed reduction ratio $\gamma$ of the continuously variable transmission 18 is increased to the maximum value $\gamma_{max}$ when the vehicle speed V is reduced to zero, that is, immediately before the vehicle is stopped, so that the vehicle can be re-started with a sufficient drive force.

To perform the belt-force control operation of the transmission 18, the electronic control device 66 first calculates a desired value of the squeezing-force control pressure $P_B$ on the basis of a detected input torque $T_{IN}$ and the detected speed reduction ratio $\gamma$ of the transmission 18, and according to predetermined relationships between these parameters $T_{IN}$, $\gamma$ and the desired value of the squeezing-force control pressure $P_B$. The control device 66 controls the squeezing-force control valve 60 provided in the hydraulic control circuit 52, to control the squeezing-force control pressure $P_B$ to the calculated desired value at which the tension of the belt 48 is held at a required minimum value. According to this belt-force control operation, the squeezing-force control pressure $P_B$ is lowered to the minimum value when the accelerator pedal 71 is not in operation, since the actual input torque $T_{IN}$ of the transmission 18 is extremely small (substantially zero) when the accelerator pedal 72 is not in operation.

Figure 7:
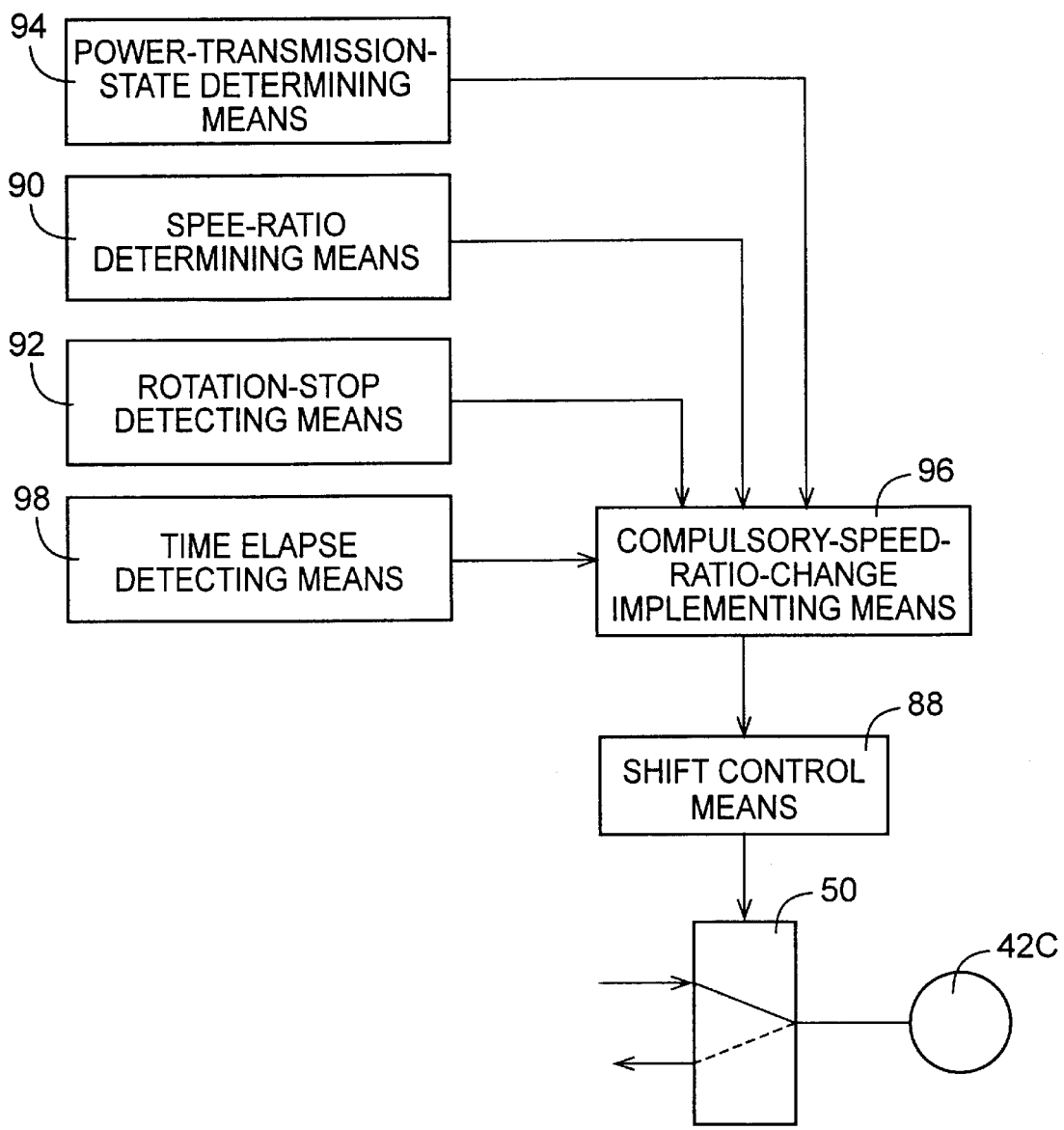
FIG. 7 is a block diagram for explaining major functional means of the control apparatus of FIG. 5.
Figure 8:
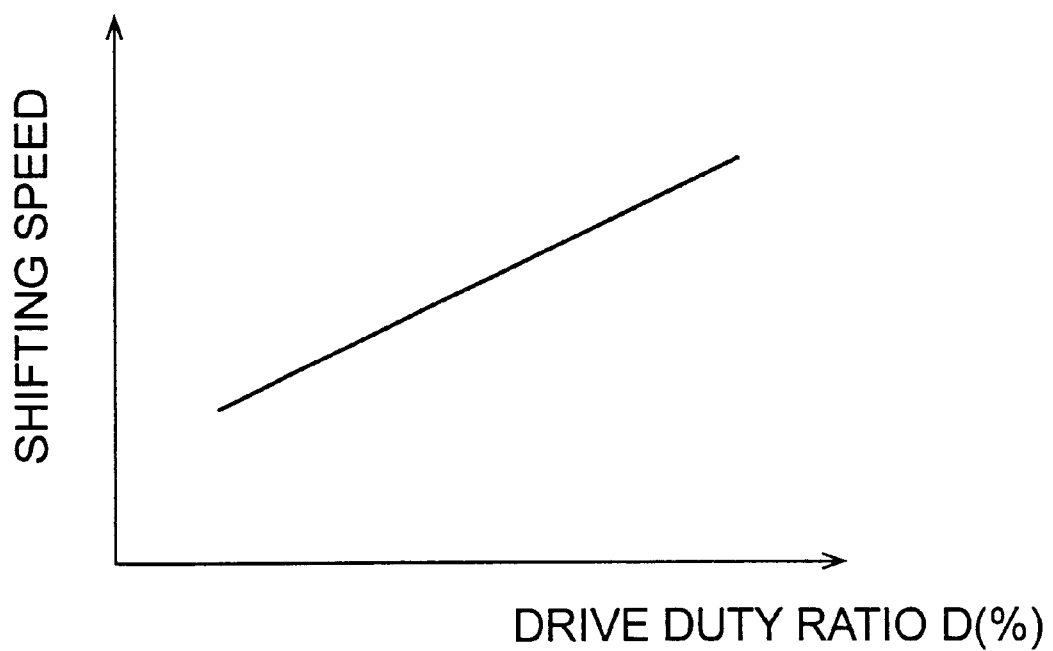
FIG. 8 is a graph indicating a relationship between a duty ratio D of a shift-up control valve or a shift-down control valve and the shift and a shifting rate of the continuously variable transmission of FIG. 1.

Referring next to the block diagram of FIG. 7, there will be described various functional means of the electronic control device 66 provided to perform the shift control operation of the continuously variable transmission 18. The electronic control device 66 includes shift control means 88, speed-ratio determining means 90, rotation-stop detecting means 92, power-transmission-state determining means 94, compulsory-speed-ratio-change implementing means 96 and time-elapse detecting means 98. The shift control means 88 is operable during running of the vehicle, and is arranged to calculate the desired input shaft speed value $N_{IN}T$ of the transmission 18 on the basis of the detected operating amount $\theta_{ACC}$ (%) of the accelerator pedal 71 and the detected vehicle running speed V (as calculated from the detected output shaft speed $N_{OUT}T$), and according to the stored predetermined relationships between those parameters $\theta_{ACC}$ and V and the desired value $N_{IN}T$, as indicated in FIG. 6, by way of example. Then, the shift control means 88 determines the duty ratio D (%) of the shift-up control valve $50_U$ or shift-down control valve $50_D$ of the shift control valve device 50 so that the actual input shaft speed $N_{IN}$ coincides with the calculated desired value $N_{IN}T$. The sift control means 88 then controls the shift-up control valve $50_U$ or shift-down control valve $50_D$ in a feedback control fashion, so as to be operated at the determined duty ratio D, for thereby controlling the rate of the fluid flow into or from the hydraulic cylinder 42c of the input-side variable-diameter pulley 42, whereby the actual input shaft speed $N_{IN}$ of the transmission 18 coincides with the calculated value $N_{IN}T$. The rate at which the speed reduction ratio $\gamma$ of the transmission 18 is varied changes with the duty ratio D of the shift-up or shift-down control valve $50_U$, $50_D$, as indicated in the graph of FIG. 8, by way of example.

The speed-ratio determining means 90 is arranged to determine whether the speed reduction ratio $\gamma$ ($N_{IN}/N_{OUT}$) of the continuously variable transmission 18 is lower than the highest value $\gamma_{MAX}$, that is, whether the transmission 18 is not placed in the lowest-speed position having the highest speed reduction ratio. For example, the determination by the speed-ratio determining means 90 is effected by determining whether the detected speed reduction ration is lower than a predetermined threshold $\gamma_A$ which is close to but slightly lower than the highest value $\gamma_{MAX}$. The rotation-stop detecting means 92 is arranged to determine whether the variable-diameter pulleys 42, 46 of the transmission 18 are at a standstill or at rest. For instance, the determination by the rotation-stop detecting means 92 is effected by determining whether the detected input shaft speed $N_{IN}$ of the transmission 18 is higher than a threshold $N_B$ which is close to zero but slightly higher than zero. The power-transmission-state determining means 94 is arranged to determine whether the transmission 18 is placed in a non-power-transmitting state in which the transmission 18 is not transmitting a drive force. For example, this determination is effected on the basis of an operation of the shift lever 67, which has drive positions such as a forward-drive position D, an engine-braking position B and a reverse-drive position R, and non-drive positions such as a parking position P and a neutral is position N. Described more specifically, the power-transmission-state determining means 94 may be arranged to determine whether a predetermined threshold time $t_C$ has elapsed after the shift lever 67 has been operated from one of the drive positions to one of the non-drive positions. Alternatively, the determination by the power-transmission-state determining means 94 may be effected by determining whether an estimated value of the input torque $T_{IN}$ of the transmission 18 has been reduced below a predetermined threshold $T_C$ which is close to but slightly larger than zero. When the shift lever 67 is operated to the parking position P or neutral position N, the forward-drive clutch 38 or reverse-drive clutch 40 is brought to its released position, so that the transmission 18 is placed in its non-drive (non-drive) position in which the transmission 18 is not capable of transmitting a drive force.

The compulsory-speed-ratio-change implementing means 96 is operated when the power-transmission-state determining means 94 determines that the transmission 18 is placed in the non-power-transmitting state while the speed-ratio determining means 90 determines that the transmission 18 is not placed in its lowest-speed position having the highest speed reduction ratio $\gamma_{MAX}$, and while the rotation-stop detecting means 92 determines that the variable-diameter pulleys 42, 46 are at rest. The compulsory-speed-ratio-change implementing means 96 is arranged to effect a compulsory shift-down action of the transmission 18, that is, to command the shift-down control valve $50_D$ of the shift control valve device 50 to be operated to its fully open position for permitting the pressurized fluid to be discharged from the input-side hydraulic cylinder 42c, to thereby increase the speed reduction ratio γ of the transmission 18 to the highest value $γ_{MAX}$, namely, to place the transmission 18 in the lowest-speed position at which the speed reduction ratio γ is highest. The time-elapse detecting means 98 is arranged to determine whether a predetermined threshold time $t_D$ has elapsed after the power-transmission-state determining means 94 determines that the threshold time $t_C$ has passed after the operation of the shift lever 67 from the drive position to the non-drive position. Alternatively, the time-elapse detecting means 98 is arranged to determine whether the predetermined threshold time $t_D$ has elapsed after the moment of initiation of the compulsory shift-down action of the transmission 18 by the compulsory-speed-ratio-change implementing means 96. The compulsory shift-down action of the transmission 18 implemented by the compulsory-speed-ratio-change implementing means 96 is continued until the time-elapse detecting means 98 has determined that the predetermined threshold time $t_D$ has elapsed. That is, the compulsory shift-down action is terminated or interrupted when the time-elapse detecting means 98 has determined that the predetermined time $t_D$ has elapsed.

Referring to the flow chart of FIG. 9, there will be described a compulsory shift-down control routine executed by the electronic control device 66 to effect a compulsory shift-down control of the transmission 18. This control routine is repeatedly executed with a predetermined cycle time, for instance, several tens of milliseconds. The compulsory shift-down control routine is initiated with step SA1 corresponding to the speed-ratio determining means 90, to determine whether the actual speed reduction ratio γ of the continuously variable transmission 18 is lower than the threshold value $γ_A$. If an affirmative decision (YES) is obtained in step SA1, the control flow goes to step SA2 corresponding to the rotation-stop detecting means 92, to determine whether the variable-diameter pulleys 42, 46 are at a standstill or at rest, that is, whether the detected input shaft speed $N_{IN}$ is lower than the predetermined threshold $N_B$. If an affirmative decision (YES) is obtained in step SA2, the control flow goes to step SA3 corresponding to the power-transmission-state determining means 94, to determine whether the continuously variable transmission 18 of belt-and-pulley type is placed in the non-power-transmitting state, that is, whether the predetermined threshold time $t_C$ has elapsed after the moment of operation of the shift lever 67 from one of the drive positions D, B, R to one of the non-drive positions P, N. The threshold time $t_C$ corresponds to a delay time from the moment of a switching operation of a manual valve (not shown) operatively connected to the shift valve 67 to the moment at which the forward-drive clutch 38 or reverse-drive brake 40 is brought to its released state. In other words, the transmission 18 is considered to be placed in the non-power-transmitting state when the threshold time $t_C$ has passed after the moment of operation of the shift lever 67 to one of the non-drive positions P, N. In view of an influence of the viscosity of the working fluid on the above-indicated delay time, however, it is preferable to increase the threshold time $t_C$ with a decrease in the detected temperature $T_{OIL}$ of the working fluid, according to a predetermined relationship between the threshold time $t_C$ and the temperature $T_{OIL}$, as indicated in the graph of FIG. 10 by way of example.

Figure 11:
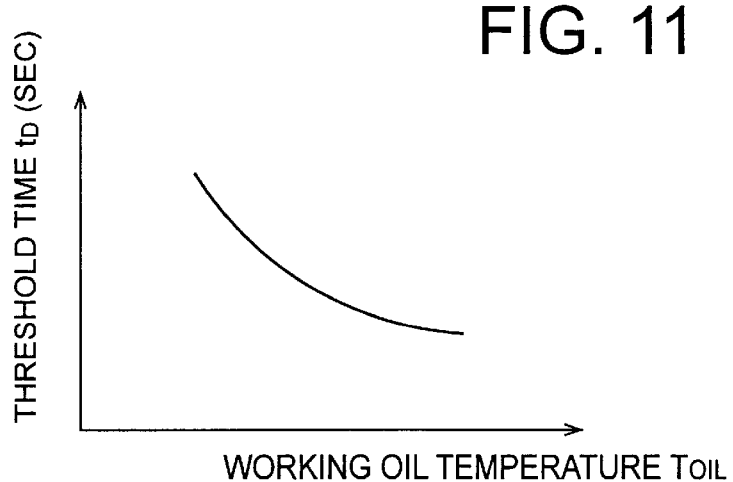
FIG. 11 is a graph illustrating a stored predetermined relationship used to determine an elapse time judgment value $t_D$ used in step SA4 of FIG. 9, on the basis of the working oil temperature $T_{OIL}$.
Figure 12:
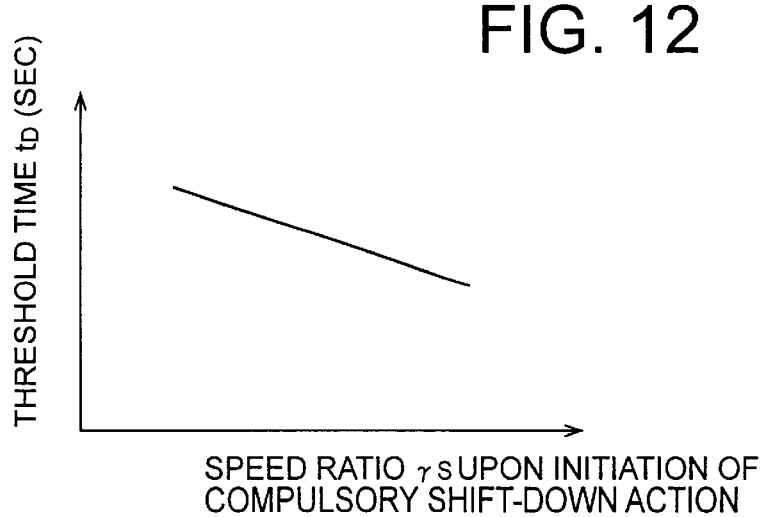
FIG. 12 is a graph illustrating a stored predetermined relationship used to determine the elapse time judgment value $t_D$ used in step SA4 of FIG. 9, on the basis of a speed ratio $\gamma_S$ upon initiation of a compulsory shift-down action of the transmission.

If an affirmative decision (YES) is obtained in step SA3, the control flow goes to step SA4 corresponding to the time-elapse detecting means 98, to determine whether the threshold time tD has elapsed after the affirmative decision (YES) is obtained in step SA3, that is, after a predetermined condition to initiate the compulsory shift-down action of the transmission 18 in step SA6 is satisfied. Step SA4 may be formulated to determine whether the threshold time $t_D$ has elapsed after the moment of initiation of the compulsory shift-down action in step SA6. The threshold time $t_D$ is determined to continue the compulsory shift-down action of the transmission 18 for a required minimum length of time, which is about two seconds. In view of an influence of the viscosity of the working fluid on the shift-down action of the transmission 18, the threshold time $t_D$ is increased with a decrease in the detected temperature $T_{OIL}$ of the working fluid, according to a predetermined relationship between the time $t_D$ and the temperature $T_{OIL}$, as indicated in the graph of FIG. 11 by way of example. For minimizing the duration of the compulsory shift-down action of the transmission 18 to an extent possible to is obtain the intended result of the compulsory shift-down action, the threshold time $t_D$ is reduced with an increase in the calculated actual speed reduction ratio $γ_S$ upon initiation of the compulsory shift-down action, according to a predetermined relationship between the time $t_D$ and the ratio $γ_S$, as indicated in the graph of FIG. 12 by way of example. The threshold time $t_D$ may be determined on the basis of the fluid temperature $T_{OIL}$ and the speed reduction ratio $γ_S$ upon initiation of the compulsory shift-down action, and according to a predetermined relationship between these parameters $γ_S$, $T_{OIL}$, and the threshold time $t_D$, which relationship is represented by a stored three-dimensional data map.

If a negative decision (NO) is obtained in step SA4, the control flow goes to step SA6 corresponding to the compulsory-speed-ratio-change implementing means 96, to command the shift-down control valve $50_D$ of the shift control valve device 50 to be operated to its fully open position, so that the pressurized fluid is discharged from the input-side hydraulic cylinder 42c, whereby the speed reduction ratio γ of the transmission 18 is reduced toward the highest value $γ_{MAX}$, that is, the compulsory shift-down action of the transmission 18 is initiated or continued. If an affirmative decision (YES) is obtained in step SA4, the control flow goes to step SA5 to terminate or interrupt the compulsory shift-down action of the transmission 18.

In the shift-control apparatus constructed according to the present embodiment described above, the compulsory-speed-ratio-change implementing means 96 is operated in step SA6 to initiate the compulsory shift-down action of the transmission 18, when the power-transmission-state determining means 94 determines in step SA3 that the transmission 18 is placed in the non-power-transmitting state while the speed-ratio determining means 90 determines in step SA1 that the transmission 18 is not placed in its lowest-speed position having the highest speed reduction ratio $γ_{MAX}$, and while the rotation-stop detecting means 92 determines in step SA3 that the variable-diameter pulleys 42, 46 are at rest. The compulsory shift-down action of the transmission 18 is effected by the compulsory-speed-ratio-change implementing means 96, to increase the speed reduction ratio γ of the transmission 18 toward its highest value $γ_{MAX}$, so that the highest speed reduction ratio $γ_{MAX}$ is established prior to re-starting the vehicle. Further, the compulsory shift-down action of the transmission 18 by the compulsory-speed-ratio-change implementing means 96 to increase the speed reduction ratio does not cause frictional sliding actions of the transmission belt 48 on the friction surfaces (V-groove surfaces) of the variable-diameter pulleys 42, 46 in the power transmitting circumferential direction, since the compulsory shift-down action is effected while the transmission 18 is placed in the non-power-transmitting state in which the transmission 18 does not transmitting a drive force. In other words, the compulsory shift-down action causes only sliding actions of the transmission belt 48 in the radial direction, and the speed of these radial sliding actions is considerably low than that of the circumferential sliding actions, so that the amount of wear of the friction surfaces of the pulleys 42, 46 is significantly reduced.

In addition, the power-transmission-state determining means 94 is arranged to determine whether the transmission 18 is placed in the non-transmitting state, by determining whether the predetermined time $t_C$ has passed from the moment of operation of the shift lever 67 by the vehicle operator from any drive position to any non-drive position. Since the power transmitting path of the power transmitting system is disconnected the predetermined time $t_C$ after the shift lever 67 is operated to the non-drive position, the non-power-transmitting state of the transmission 18 can be highly reliably detected by the power-transmission-state determining means 94.

Furthermore, the shift control apparatus according to the present invention is adapted to terminate the shift-down action of the transmission 18 when the predetermined time $t_D$ has elapsed after the moment of initiation of the compulsory shift-down action to increase the speed reduction ratio $\gamma$. This arrangement is effective to prevent continuation of the compulsory shift-down action for an unnecessarily long time duration, that is, for more than the predetermined time $t_D$.

The present shift control apparatus is further arranged to determine the time $t_D$ such that the time $t_D$ decreases with an increase in the detected temperature $T_{OIL}$ of the working fluid of the transmission 18, according to the predetermined relationship between the time $t_D$ and the temperature $T_{OIL}$, as indicated in the graph of FIG. 11 for illustrative purpose only. This arrangement permits the shift-down action of the transmission 18 for the required minimum time, irrespective of a variation in the viscosity of the working fluid with a change in the fluid temperature.

The present shift control apparatus is further arranged to determine the time $t_D$ such that the time $t_D$ decreases with an increase in the speed reduction ratio $\gamma_S$ of the transmission upon initiation of the shift-down action of the transmission 18, according to the predetermined relationship between the time $t_D$ and the ratio $\gamma_S$, as indicated in the graph of FIG. 12 for illustrative purpose only. This arrangement permits the shift-down action of the transmission 18 for the required minimum time, which varies with the speed reduction ratio $\gamma_S$ upon initiation of the shift-down action.

Referring to the flow chart of FIG. 13, there will be described a shift control apparatus according to another embodiment of this invention. The same reference signs as used in the first embodiment will be used in this second embodiment, to identify the functionally corresponding elements, which will not be described.

The flow chart of FIG. 13 illustrates a compulsory shift-down control routine executed by the electronic control device 66 to effect a compulsory shift-down control of the transmission 18 according to the second embodiment. This control routine is initiated with step SB1 corresponding to the speed-ratio determining means 90, to determine whether the actual speed reduction ratio $\gamma$ of the continuously variable transmission 18 is lower than the threshold value $\gamma_A$. If an affirmative decision (YES) is obtained in step SB1, the control flow goes to step SB2 corresponding to the rotation-stop detecting means 92, to determine whether the variable-diameter pulleys 42, 46 are at a standstill or at rest, that is, whether the detected input shaft speed $N_{IN}$ is lower than the predetermined threshold $N_B$. If an affirmative decisior (YES) is obtained in step SB2, the control flow goes to step SB3 corresponding to the power-transmission-state determining means 94, to determine whether the continuously variable transmission 18 of belt-and-pulley type is placed in the non-power-transmitting state, that is, whether an estimated value of the input shaft torque $T_{IN}$ of the transmission 18 is equal to or smaller than a predetermined threshold Tc, which is close to but slightly larger than zero. The input shaft torque $T_{IN}$ may be estimated, for example, by subtracting the drive torque of an optional device (e.g., an air conditioner) driven by the engine 12, from a commanded output torque of the engine 12 which is represented by an engine control signal generated by an electronic engine control unit.

If an affirmative decision (YES) is obtained in step SB3, the control flow goes to step SB4 corresponding to the time-elapse detecting means 98, to determine whether the threshold time tD has elapsed after the affirmative decision (YES) is obtained in step SB3, that is, after a predetermined condition to initiate the compulsory shift-down action of the transmission 18 in step SB6 is satisfied. Step SB4 may be formulated to determine whether the threshold time tD has elapsed after the moment of initiation of the compulsory shift-down action in step SB6. The threshold time tD is determined to continue the compulsory shift-down action of the transmission 18 for the required minimum length of time (about two seconds), on the basis of the detected temperature $T_{OIL}$ and the speed reduction ratio $\gamma_S$ upon initiation of the compulsory shift-down action of the transmission 18, and according to the predetermined relationships as indicated in the graphs of FIGS. 11 and 12, as in the first embodiment. If a negative decision (NO) is obtained in step SB4, the control flow goes to step SB6 corresponding to the compulsory-speed-ratio-change implementing means 96, to command the shift-down control valve $50_D$ of the sift control valve device 50 to be operated to its fully open position, so that the pressurized fluid is discharged from the input-side hydraulic cylinder 42c, whereby the speed reduction ratio $\gamma$ of the transmission 18 is reduced toward the highest value $\gamma_{MAX}$, that is, the compulsory shift-down action of the transmission 18 is initiated or continued. If an affirmative decision (YES) is obtained in step SB4, the control flow goes to step SB5 to terminate or interrupt the compulsory shift-down action of the transmission 18.

The shift control apparatus constructed according to the present second embodiment described above provides substantially the same advantages as described above with respect to the first embodiment. Another advantage is provided by the power-transmission-state determining means 94, which is arranged to determine in step SB3 that the transmission 18 is placed in its non-power-transmitting state, when the estimated value of the input torque $T_{IN}$ of the transmission 18 is substantially zero. Described more specifically, the threshold value $T_C$ for the input torque $T_{IN}$ is determined as described above, the non-power-transmitting state of the transmission 18 can be detected with high reliability, even when substantially the entire output torque of the engine 12 is consumed by an optional device such as an electric generator (for charging a battery) or an air conditioner. The present arrangement permits the compulsory shift-down action of the transmission 18 even when the engine 12 is operated to operate such an optional device.

While the presently preferred embodiments of this invention have been described above by reference to the accompanying drawings, for illustrative purpose only, it is to be understood that the present invention may be otherwise embodied.

For instance, the shift control apparatus according to the present invention may be adapted to control a continuously variable transmission of a toroidal type or any other types, rather than the belt-and-pulley type continuously variable transmission 18 including a pair of variable-diameter pulleys 42, 46 connected by the transmission belt 48. Namely, the shift control apparatus according to the present invention is applicable to any type of continuously variable transmission including rotary elements connected by a power transmitting member and operable to change its speed ratio by changing the effective diameters of the rotary elements at which the power transmitting member frictionally contacts the friction surfaces of the rotary elements.

While the automotive vehicle whose continuously variable transmission 18 is controlled by the shift control apparatus according to each of the illustrated embodiments, the shift control apparatus is applicable to a continuously variable transmission of any type of automotive vehicle, such as electric vehicles such as a hybrid vehicle, which includes at least one drive power source, such as an electric motor, a motor/generator, and an engine.

Although the ratio $\gamma$ of the transmission 18 to be controlled in the illustrated embodiments is a speed reduction ratio, namely, a ratio of the input shaft speed $N_{IN}$ to the output shaft speed $N_{OUT}$, the ratio to be controlled is a ratio of the output shaft speed $N_{OUT}$ to the input shaft speed $N_{IN}$.

Figure 9:
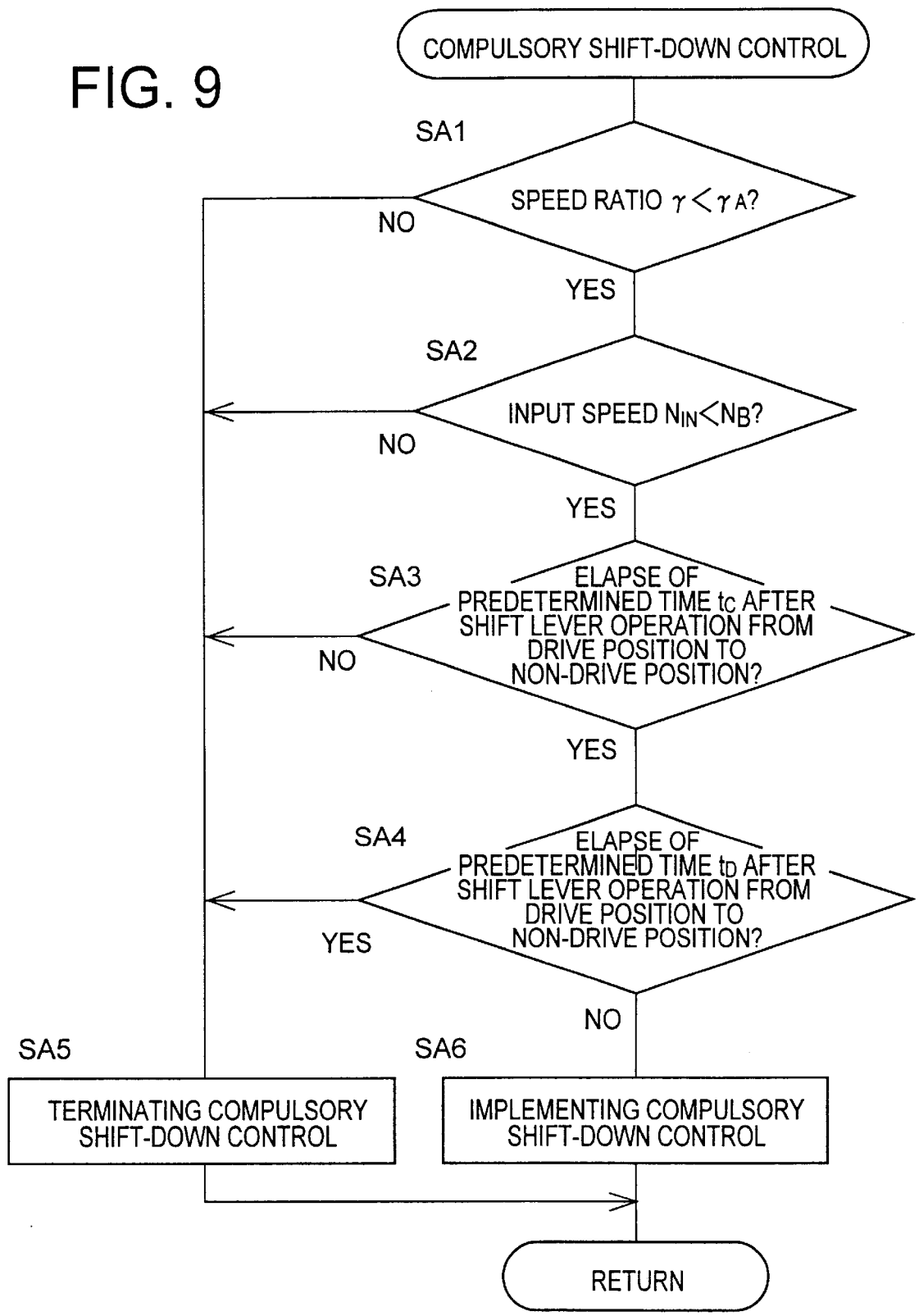
FIG. 9 is a flow chart illustrating a portion of a control operation of the control apparatus of FIG. 5.
Figure 10:
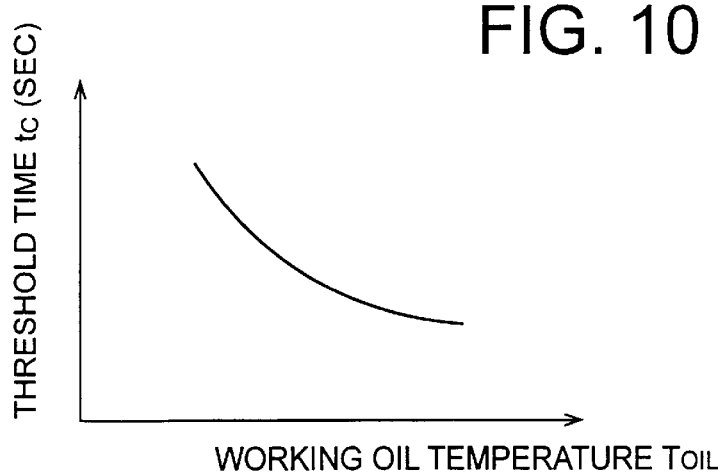
FIG. 10 is a graph illustrating a stored predetermined relationship used to determine a judgment time $t_C$ used in step SA3 of FIG. 9, on the basis of a working oil temperature $T_{OIL}$.

The electronic control device 66 serving as the shift control apparatus may be adapted to execute both of the compulsory shift-down control routine of FIG. 9 and the compulsory shift-down control routine of FIG. 13.

It is to be understood that the present invention may be embodied with various other changes, modifications and improvements, which may occur to those skilled in the art, in the light of the forgoing teachings.

What is claimed is:

1. A shift control apparatus for controlling a continuously variable transmission device including a continuously variable transmission mechanism having rotary elements and operable to transmit a rotary motion of a drive power source of an automotive vehicle to a drive wheel of the automotive vehicle, such that a speed ratio of said mechanism is continuously variable, comprising:

power-transmitting-state determining means for determining whether said continuously variable transmission mechanism is placed in a non-power-transmitting state in which said mechanism is not transmitting a drive force;

speed-ratio determining means for determining whether said continuously variable transmission mechanism is placed in a lowest-speed position;

rotation-stop detecting means for determining whether said rotary elements are at rest; and compulsory-speed-ratio-change implementing means for effecting a compulsory shift-down action of said continuously variable transmission mechanism toward said lowest-speed position if said power-transmitting-state determining means has determined that said continuously variable transmission mechanism is placed in said non-power-transmitting state, if said speed-ratio determining means has determined that said continuously variable transmission mechanism is not placed in said lowest-speed position and if said rotation-stop detecting means has determined that said rotary elements of said mechanism are at rest.

2. A shift control apparatus according to claim 1, wherein the automotive vehicle includes a manually operable member which is operable by an operator of the automotive vehicle to select one of a plurality of operating states of said continuously variable transmission device and which has a drive position for selecting a power-transmitting state of said transmission device, and a non-drive position for selecting said non-power-transmitting state, said power-transmission-state determining means being operable to determine that said continuously variable transmission mechanism is placed in said non-power-transmitting state when a predetermined time has elapsed after said manually operable member has been operated from said drive position to said non-drive position.

3. A shift control apparatus according to claim 1, wherein said power-transmission-state determining means is operable to determine that said continuously variable transmission mechanism is placed in said non-power-transmitting state when an input torque of said transmission mechanism has been substantially zeroed.

4. A shift control apparatus according to claim any one of claims 1–3, further comprising time-elapse detecting means for determining whether a predetermined time duration has elapsed after a moment of initiation of said compulsory shift-down action of said continuously variable transmission mechanism by said compulsory-speed-ratio-change implementing means, said compulsory-speed-ratio-change implementing means terminating said compulsory shift-down action when said predetermined time duration has passed after said moment of initiation of the compulsory shift-down action.

5. A shift control apparatus according to claim 4, wherein said predetermined time duration is determined on the basis of a detected temperature of a working fluid of said continuously variable transmission device, and according to a predetermined relationship between said time duration and the temperature of the working fluid.

6. A shift control apparatus according to claim 4, wherein said predetermined time duration is determined on the basis of said speed ratio of said continuously variable transmission mechanism upon initiation of said compulsory shift-down action, and according to a predetermined relationship between said time duration and said speed ratio.

7. A shift control apparatus according to claim 1, wherein said speed ratio of said continuously variable transmission mechanism is a speed reduction ratio, which is a ratio of an input speed of said transmission mechanism to an output speed of said transmission mechanism.

8. A shift control apparatus according to claim 1, wherein said continuously variable transmission device is a continuously variable transmission of belt-and-pulley type including a continuously variable transmission mechanism which includes a pair of variable-diameter pulleys as said rotary elements and a transmission belt connecting said pair of variable-diameter pulleys, said speed ratio being changed by changing effective diameters of said variable-diameter pulleys at which said transmission belt engages said variable-diameter pulleys.

* * * * *